US009661626B2

(12) United States Patent
Buer et al.

(10) Patent No.: US 9,661,626 B2
(45) Date of Patent: *May 23, 2017

(54) METHOD AND SYSTEM FOR UTILIZING STANDARDIZED INTERFACE IN A WIRELESS DEVICE TO DISCOVER AND USE LOCAL AND REMOTE RESOURCES

(71) Applicant: AVAGO TECHNOLOGIES GENERAL IP (SINGAPORE) PTE. LTD., Singapore (SG)

(72) Inventors: Mark Buer, Payson, AZ (US); Thomas Quigley, Franklin, NC (US); Alexander G. MacInnis, Los Altos, CA (US); Arya Behzad, Los Altos, CA (US); Jeyhan Karaoguz, Irvine, CA (US); John Walley, Ladera Ranch, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 11 days.

This patent is subject to a terminal disclaimer.

(21) Appl. No.: 14/706,515

(22) Filed: May 7, 2015

(65) Prior Publication Data

US 2015/0237608 A1  Aug. 20, 2015

Related U.S. Application Data

(63) Continuation of application No. 14/031,834, filed on Sep. 19, 2013, now Pat. No. 9,042,329, which is a (Continued)

(51) Int. Cl.
*H04W 4/00* (2009.01)
*H04W 72/04* (2009.01)
(Continued)

(52) U.S. Cl.
CPC ....... *H04W 72/042* (2013.01); *H04W 40/246* (2013.01); *H04W 84/18* (2013.01)

(58) Field of Classification Search
CPC ............. H04W 72/04; H04W 72/0406; H04W 72/0413; H04W 72/042; H04W 72/0426;
(Continued)

(56) References Cited

U.S. PATENT DOCUMENTS 7,292,579 B2   11/2007  Morris
7,412,236 B1    8/2008  Blight et al.
(Continued)

FOREIGN PATENT DOCUMENTS

KR    2005-0070152   7/2005
KR    2006-0071299   6/2006
(Continued)

OTHER PUBLICATIONS

European Search Report corresponding to European Patent Application Serial No. 08011456.4-1249, dated Aug. 28, 2008, 3 pages.
(Continued)

*Primary Examiner* — Kevin Mew
(74) *Attorney, Agent, or Firm* — Oblon, McClelland, Maier & Neustadt, L.L.P.

(57) ABSTRACT

A wireless mobile communication (WMC) device may discover available networks, and available local and/or remote resources. The WMC device may configure routes utilizing one or more of discovered resources and one or more available networks. The routes may be utilized to performed operations requested via the WMC device. A standardized language and/or protocol may be utilized in discovering and/or communicating with available resources and/or networks. The standardized language and/or protocol may enable commonality among the discovered networks and/or resources, and encryption of data communicated
(Continued)

through the established routes. The standardized language and/or protocol may be updated and/or modified to incorporate new resources either by direct interactions between the new resources and the WMC device, or via existing available resources and/or networks. The discovery of resources and/or establishment of routes may be user-triggered, or it may be based on user preference information.

20 Claims, 4 Drawing Sheets

Related U.S. Application Data continuation of application No. 11/864,095, filed on Sep. 28, 2007, now Pat. No. 8,553,623.

(60) Provisional application No. 60/950,972, filed on Jul. 20, 2007.

(51) Int. Cl.
*H04W 84/18* (2009.01)
*H04W 40/24* (2009.01)

(58) Field of Classification Search
CPC ......... H04W 72/0433; H04W 72/1278; H04W 72/1284; H04W 72/1289; H04W 72/1294; H04W 72/14; H04W 84/18; H04W 40/246
See application file for complete search history.

(56) References Cited

U.S. PATENT DOCUMENTS

| | | | |
|---|---|---|---|
| 7,639,663 B1* | 12/2009 | Nerses | H04L 47/14 370/347 |
| 7,952,831 B2 | 5/2011 | Kim et al. | |
| 8,265,046 B2 | 9/2012 | Kuokkanen | |
| 8,285,259 B2 | 10/2012 | Karkanias et al. | |
| 8,331,294 B2 | 12/2012 | MacInnis et al. | |
| 8,331,334 B2 | 12/2012 | Quigley et al. | |
| 8,358,638 B2 | 1/2013 | Scherzer et al. | |
| 8,553,623 B2 | 10/2013 | Buer et al. | |
| 8,578,015 B2* | 11/2013 | Billhartz | H04L 43/0823 370/254 |
| 9,036,509 B1* | 5/2015 | Addepalli | H04W 4/046 370/259 |
| 9,042,329 B2* | 5/2015 | Buer | H04L 12/5691 370/329 |
| 2002/0093980 A1 | 7/2002 | Trebes, Jr. | |
| 2002/0099799 A1 | 7/2002 | Kolsky | |
| 2003/0095524 A1 | 5/2003 | Stephens et al. | |
| 2004/0081127 A1 | 4/2004 | Gardner et al. | |
| 2004/0103308 A1 | 5/2004 | Faller | |
| 2004/0179597 A1 | 9/2004 | Rault | |
| 2004/0268407 A1* | 12/2004 | Sparrell | G06F 1/266 725/116 |
| 2005/0220139 A1 | 10/2005 | Aholainen | |
| 2005/0276229 A1 | 12/2005 | Torabi | |
| 2006/0098649 A1 | 5/2006 | Shay | |
| 2006/0146731 A1 | 7/2006 | Lewis et al. | |
| 2006/0227808 A1 | 10/2006 | Estable | |
| 2007/0087756 A1* | 4/2007 | Hoffberg | G06Q 10/0631 455/450 |
| 2007/0155443 A1 | 7/2007 | Cheon et al. | |
| 2007/0253339 A1 | 11/2007 | Ovadia et al. | |
| 2008/0013502 A1* | 1/2008 | Clark | G08C 17/00 370/338 |
| 2008/0299951 A1 | 12/2008 | Karkanias et al. | |
| 2008/0310377 A1 | 12/2008 | Flammer et al. | |
| 2009/0022092 A1* | 1/2009 | MacInnis | H04W 84/12 370/328 |
| 2009/0022096 A1 | 1/2009 | Walley et al. | |
| 2009/0022117 A1* | 1/2009 | Quigley | H04L 45/302 370/338 |
| 2009/0022118 A1 | 1/2009 | Behzad et al. | |
| 2009/0029703 A1 | 1/2009 | Tumbull et al. | |
| 2009/0043911 A1 | 2/2009 | Flammer et al. | |
| 2009/0215411 A1* | 8/2009 | Tucker | H04W 4/10 455/90.2 |
| 2009/0310567 A1 | 12/2009 | Gupta et al. | |
| 2010/0299452 A1 | 11/2010 | Flammer et al. | |
| 2012/0182887 A1* | 7/2012 | Junell | H04L 5/0037 370/252 |
| 2013/0201966 A1* | 8/2013 | Weng | H04W 72/04 370/336 |

FOREIGN PATENT DOCUMENTS

| | | |
|---|---|---|
| WO | WO 00/10306 | 2/2000 |
| WO | WO 01/98867 | 12/2001 |

OTHER PUBLICATIONS

George Koundourakis, et al., "Network-Based Access Selection in Composite Radio Environments", Wireless Communications and Networking Conference, Mar. 1, 2007, pp. 3877-3883.
Seagate Technology, LLC, Seagate, D.A.V.E (Digital Audio Video Experience) Transform the consumer digital content experience with the Seagate D.A.V.E design concept, Data Sheet, 2007.
Seagate Technology, LLC, Seagate, D.A.V.E. (Digital Audio Video Experience) The portable storage platform that collects, plays and manages digital content, Product Overview, 2007.
European Patent Office, EP Communication dated May 4, 2010, in re Application No. 08 011 456.4.

\* cited by examiner

METHOD AND SYSTEM FOR UTILIZING STANDARDIZED INTERFACE IN A WIRELESS DEVICE TO DISCOVER AND USE LOCAL AND REMOTE RESOURCES

CROSS-REFERENCE TO RELATED APPLICATIONS/INCORPORATION BY REFERENCE

The present application is a continuation application of and claims the benefit of priority under 35 U.S.C. §120 from U.S. application Ser. No. 14/031,834, filed Sep. 19, 2013, which is a continuation application of U.S. application Ser. No. 11/864,095, filed on Sep. 28, 2007, now U.S. Pat. No. 8,553,623, which claims priority to and is based upon U.S. Provisional Application Ser. No. 60/950,972, Jul. 20, 2007, the entire contents of each of which is incorporated herein by reference.

FIELD OF THE INVENTION

Certain embodiments of the invention relate to wireless devices. More specifically, certain embodiments of the invention relate to a method and system for utilizing a standardized interface in a wireless device to discover and use local and remote resources.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. A lot of wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For example, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services comprise such features as text messaging, audio/video streaming, and web browsing.

Some WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, cellular technology may allow use of the mobile phone as a form of wireless modem that allows connecting a laptop, for example, to the internet via a cellular network.

Devices aimed at taking advantage of the capabilities of wireless networks may be described as wireless mobile communication (WMC) devices. Today's WMC devices may comprise such devices as cellular phones, PDA's, laptops, and/or other devices.

Most WMC devices nowadays offer more than simple communicative operations. These WMC devices, in addition to providing peer-to-peer communication functions, may allow their users expansive list of personal services and utilities. Some WMC devices may enable a broad scope of gaming, scheduling, task-organizational and/or other services. Additionally, more applications that traditionally were limited to non-wireless and/or non-mobile devices may be used in conjunction with WMC devices. For example, email applications such as Microsoft Outlook® are finding their way to more WMC devices. Other applications that have gained popularity in recent years comprise audio/video applications such as still and moving picture recording application and voice recording applications. These added capabilities and/or applications are slowly turning WMC devices into indispensable on-the-move personal assistants.

However, the promising potential of WMC devices' uses beyond simple communicative operations remains stagnant because of some limitations in the devices themselves, which may include such limitations as power, storage, and/or processing. Also, while a lot of work has been put into expanding WMC devices' potential utility, not a lot of work has been put into convening these new utilities for their users. For example, while the WMC devices offer impressive array of recording, organizing, and tracking services, very little effort has been made to facilitate convenient use of data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing a standardized interface in a wireless device to discover and use local and remote resources, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a standardized interface in a wireless device to discover and use local and remote resources. A wireless mobile communication (WMC) device may discover available networks, and available resources. The discovered resource may be local resources located within communicative operational proximity to the WMC device and/or through discovered networks; additionally, the discovered resources may comprise remote resources access through one of more of available networks. The WMC device may configure routes utilizing one or more of discovered resources and/or one or more available networks. The routes may be utilized to perform operations requested via the WMC device. A standardized language and/or protocol may be utilized for discovering and/or communicating with available resources and/or networks. The standardized language and/or protocol may enable commonality among elements of established routes. The standardized language and/or protocol may enable encryption of data communicated through the established routes. The standardized language and/or protocol may be updated and/or modified to incorporate new resources either by direct interactions between said new resources and the WMC device, or via existing available resources and/or networks. The discovery of resources and/or establishment of routes may be user-triggered, or it may be based on existing user preference information.

Figure 1:
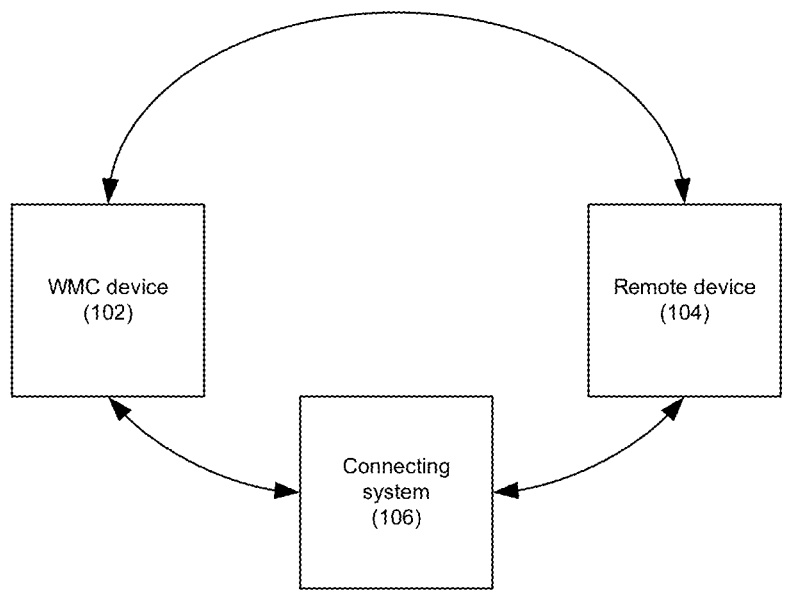
FIG. 1 is a block diagram that illustrates an exemplary communication setup between a wireless mobile communication (WMC) device and a resource, which may utilize standardized language and/or protocol, in accordance with an embodiment of the invention.

FIG. 1 is a block diagram that illustrates an exemplary communication setup between a wireless mobile communication (WMC) device and a resource, which may utilize standardized language and/or protocol, in accordance with an embodiment of the invention. Referring to FIG. 1, there is shown a wireless mobile communication (WMC) device 102, a resource 104, and a connecting system 106.

The WMC device 102 may comprise suitable logic, circuitry and/or code that may enable performing wireless mobile communication. For example, the WMC device 102 may be utilized to perform voice, video and/or text message peer-to-peer communication. The WMC device 102 may also comprise suitable logic, circuitry and/or code that may enable performing additional functionality comprising Internet browsing, video streaming, and/or audio recording and/or playback. For example, the WMC device 102 may comprise a digital camera that may enable generating still digital pictures and/or video streams, and/or the WMC device 102 may comprise a microphone that may enable generating audio recordings. Additionally, the WMC device 102 may comprise a screen that may enable displaying existing still digital pictures and/or playing back existing digital video streams, and/or the WMC device 102 may comprise speakers that may enable playing back existing audio files.

The resource 104 may comprise suitable logic, circuitry and/or code that may be enabled to communicate with the WMC device 102. The invention may not be limited to a specific resource, but may comprise for example, a general purpose processing device, a specialized processing device, and/or a specialized peripheral device which may be enabled to perform various jobs and/or tasks that may be requested by the WMC device 102. The resource 104 may comprise a personal computer (PC), a high-definition television (HDTV) set, a printer/scanner/fax device, a dedicate memory storage device, and/or a digital video recorder device. For example, the resource 104 may comprise a home PC that may be more capable or suitable of performing processing and/or storage operations than the WMC device 102 due to more powerful processing subsystems and/or increased memory space compared to the WMC device 102. Such home PC may be better suited to perform processing and/or storage intensive tasks that otherwise would have to be performed in the WMC device 102. A networked HDTV monitor may be more suitable for display high definition multimedia content rather than the WMC device 102.

The connecting system 106 may comprise a plurality of interconnecting networks and suitable logic, circuitry and/or code that may be enabled to facilitate end-to-end communication between the WMC device 102 and the resource 104. The connecting system 106 may comprise wireless and/or wired networks that may be enabled to communicate and forward messaging and/or data between the WMC device 102 and the resource 104. The connecting system 106 may be utilized to provide a transport and/or switching fabric that may facilitate communication between the WMC device 102 and the resource 104.

In operation, the WMC device 102 may communicate with the resource 104 through the connecting system 106, or alternatively, where possible, the WMC device 102 may communicate directly with the resource 104.

The WMC device 102 may be utilized for communicative tasks that may comprise performing voice, video and/or text messaging peer-to-peer communications with a corresponding end. The WMC device 102 may also be utilized for non-communicative tasks. For example, the WMC device 102 may be utilized to create and/or play video, audio, and/or other types of multimedia data files. The WMC device 102 may be enabled to perform such non-communicative tasks internally. For example, the WMC device 102 may create multimedia files directly utilizing a digital camera and/or microphone. The multimedia files may be stored directly in the WMC device 102, and may be displayed and/or played back when necessary.

The WMC device 102 may utilize the resource 104 for performing some of the communicative tasks requested in the WMC device 102. For example, where the resource 104 may comprise faxing capability, the WMC device 102 may utilize the resource 104 to communicate a fax to a receiving end. The WMC device 102 may utilize the resource 104 for performing some of the non-communicative tasks requested in the WMC device 102. For example, where necessary and/or feasible, the WMC device 102 may utilize the resource 104 to perform processing sub-tasks, to store data, and/or to display or to play multimedia files. Because of size and/or power limitations, storage capacity may be limited in the WMC device 102, and consequently it may be desirable to store multimedia data files, which generally are large files, in the resource 104 where such storage may be feasible. Alternatively, the WMC device 102 may utilize the resource 104 for displaying and/or playing back multimedia data files. For example, where the resource 104 may offer improved display capability, such as HD capability, the WMC device 102 may delegate display operation to the resource 104.

The WMC device 102 may be required to configure the resource 104 in order to facilitate use of the resource 104. For example, in instances where the resource 104 may comprise digital video recording capabilities, the WMC device 102 may be enabled to specify certain parameters and/or attributes to facilitate use of the resource 104 to perform digital video recording. The WMC device 102 may need to specify start-time, end-time, and/or channel information.

In accordance with an embodiment of the invention, user preference information may be utilized in configuration operations. Creation, storage, and/or display or playback of such multimedia data files may be based on direct user commands, and/or based on user preference information. User preference information may comprise specific configuration and/or use settings that may be utilized for each specific type of resources that the WMC device 102 may be capable of communicating with. For example, the user preference information may comprise settings to be utilized while operating an HDTV of certain make/model.

The WMC device 102 may utilize a standardized language and/or protocol in configuration and/or operations of resources. The standardized language and/or protocol may comprise information and/or mechanisms that may enable the WMC device 102 to communicate with desired resources. For example, the standardized language and/or protocol may comprise look-up tables that specify available capabilities for known resources based on class and/or make/model. The standardized language and/or protocol may comprise a mechanism that enable the resources to report to the WMC device 102 available capabilities in said resources based on direct inquiry by the WMC device 102, and/or where a specified event may occur. For example, the standardized language and/or protocol may specify that a storage resource may send a notification to the WMC device 102 when storage space of certain size may become available. The standardized language and/or protocol may require a specific format that resources communicating with the WMC device 102 would have to utilize, wherein a common parsing functionality may enable the WMC device 102 to analyze the capabilities and availability on resources.

Figure 2:
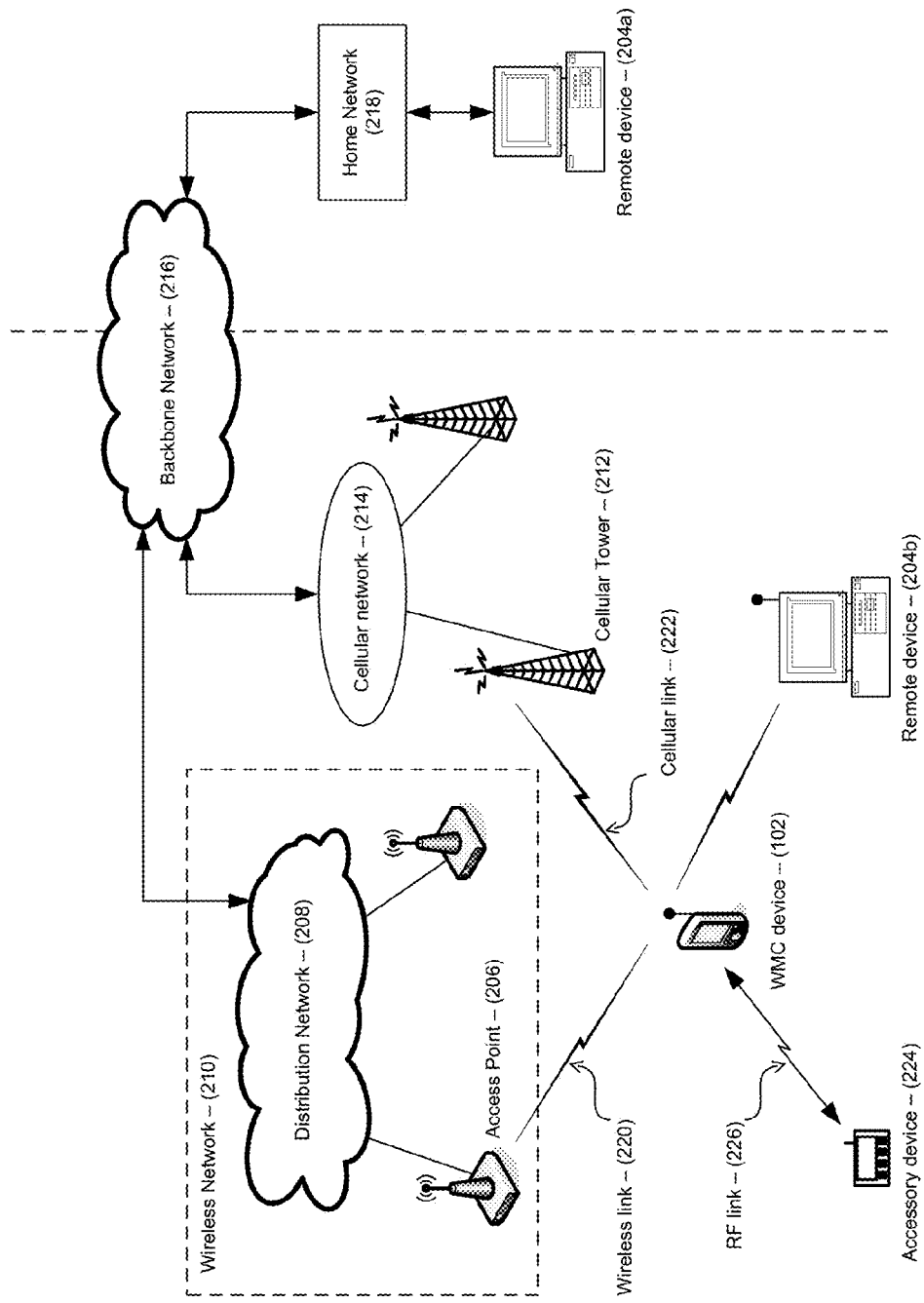
FIG. 2 is a block diagram that illustrates an exemplary model for setup that includes a wireless mobile communication (WMC) device communicating with remote and local resources, which may utilize standardized language and/or protocol, in accordance with an embodiment of the invention.

FIG. 2 is a block diagram that illustrates an exemplary model for setup that includes a wireless mobile communication (WMC) device and resources, which may utilize standardized language and/or protocol, in accordance with an embodiment of the invention. Referring to FIG. 2, there is shown the WMC device 102, resources 204*a* and 204*b*, an access point 206, a distribution network 208, a wireless network 210, a cellular tower 212, a cellular network 214, a backbone network 216, a home network 218, a wireless link 120, a cellular link 222, an accessory device 224, and a RF link 226.

The resources 204*a* and 204*b* may be comprises substantially similar to the resource 104. Additionally, the resource 204*b* may also comprise suitable logic, circuitry, and/or code that may enable wireless connectivity, wherein the WMC device 102 may communicate directly with the resource 204*b* via a wireless connection.

The wireless network 210 may comprise a plurality of the access point 206, the distribution network 208 and suitable logic, circuitry and/or code that may enable implementing a functional block corresponding to a wireless technology. Exemplary wireless technology may comprise for example the IEEE 802.11 (WLAN) or WiMAX (IEEE 802.16) architecture. The access point 206 may comprise suitable logic, circuitry, and/or code that may be utilized to provide the necessary access infrastructure for the WMC device 102 to access the wireless network 210. The distribution network 108 may comprise suitable logic, circuitry, and/or code that may be adapted to operate as a backbone network that may be responsible for transport and link functionality for a plurality of access points in the wireless network 210.

The cellular network 214 may comprise plurality of the cellular tower 212 or base stations, and suitable logic, circuitry and/or code that may enable implementing a functional block corresponding to a cellular technology. Exemplary cellular technology may comprise cellular technologies that enable data services, including but not limited to, CDMA, WCDMA, CDMA1000, HSDPA, GSM, GPRS, EDGE, and UMTS.

The accessory device 224 may comprise suitable logic, circuitry and/or code that may enable performing some accessory functionality in conjunction with the use of the WMC device 102. For example, the accessory device may comprise a hands-free headset. The WMC device 102 may interact with the accessory device 224 over a short-range RF link 226, for example. The RF link 226 may utilize, for example, a standardized technology for inter-device short range communication. For example, the RF link 226 may correspond to a Bluetooth® connection or ZigBee connection between the accessory device 224 and the WMC device 102.

The home network 218 may comprise suitable logic, circuitry and/or code that may enable local connectivity. This local connectivity may comprise use of Local Area Network (LAN) technologies that enable data services, including but not limited to, IEEE 802.3 Ethernet. Other technologies may comprise WiMAX.

The backbone network 216 may comprise suitable logic, circuitry, and/or code that may be adapted to provide overall system connectivity between sub-networks. The backbone network 216 may be enabled to interact with, and connect different wired and/or wireless technologies. For example, the backbone network 216 may comprise a standard telephony network (POTS) that may enable data connectivity between different interface nodes linking wired and/or wireless networks comprising WLAN networks, WiMAX networks, cellular networks, and/or LAN networks.

In operation, the WMC device 102 may utilize the wireless link 220 to access the wireless network 210 via the access point 206. The WMC device 102 may also utilize the cellular link 222 to access the cellular network 214 via the cellular tower 212. The WMC device 102 may attempt to communicate with the resource 204*a* via the wireless network 210 through the access point 206 and the distribution network 208. The distribution network 208 may enable forwarding messages and/or data sent from/to the WMC device 102. The backbone network 216 may enable connectivity between local networks, for example wireless network 210, and cellular network 214. Additionally the backbone network 216 may enable connectivity with the home network 218. The home network 218 may enable indirect connectivity between the WMC device 102 and remote resources. The resource 204a may receive communication from the WMC device 102 by interacting with the backbone network 216 through the home network 218. Necessary protocol-based operations may be performed to facilitate the transmission of information through all the different components. This may comprise use of exemplary protocols such as IP, and SS7.

The resource 204b may operate similar to the resource 104 as described in FIG. 1. However, the WMC device 102 may communicate directly with the resource 204b over a wireless connection. The resource 204b may be operated as a stand-alone device, or it may be operated within a compatible network, wherein the resource may be integrated. The ability to communicate directly with the resource 204b may allow improved utilization of the resource 204b by the WMC device 102. The direct wireless connection between the WMC device 102 and the resource 204b may enable faster and more reliable communication between the two devices. The improvement may be due to the characteristics of the wireless connection between the resource 204b and the WMC device 102, for example having greater bandwidth. The improvement may also be due to reduced delays compared to setups where the WMC device 102 may have to communicate with the resource 104 through a plurality of connecting networks and/or entities.

Once the WMC device 102 establishes connectivity with the resources 204a and/or 204b, the WMC device 102 may utilize the resources 204a and/or 204b in operations substantially as described in FIG. 1. The WMC device 102 may utilize the resources 204a and/or 204b to perform some of the communicative and/or non-communicative tasks requested in the WMC device 102. For example, WMC device 102 may utilize the resources 204a and/or 204b to communicate a fax to a receiving end, to perform processing tasks, to store data, and/or to display or to play multimedia data files.

The standardized language and/or protocol may enable the WMC device 102 to utilize its connectivity in discovery of available resources. For example, the WMC device 102 may establish connectivity with the cellular network 214 via the cellular tower 212. The cellular network 214 may be enabled to utilize the standardized language and/or protocol that the WMC device 102 may utilize in communicating with, and/or delegating tasks through to available resources. Once connectivity is established between the WMC device 102 and the cellular network 214, the WMC device 102 may utilize the standardized language and/or interface inquire about the availability of a class of resources that may comprise the remote resource 204a. The cellular network 214 may utilize the standardized language and/or protocol to report to the WMC device 102 the availability of the remote resource 204a, which the cellular network 214 may be enable to communicate with through the backbone network 216 and the home network 218. The standardized language and/or protocol may also enable direct auto discovery of available resources in the WMC device 102. For example, the WMC device 102 may utilize the standardized language and/or protocol to transmit, within the operational proximity of the WMC device 102, discovery inquiry for class of resources that may comprise the local resource 204b. Wherein the resource 204b may receive the discovery inquiry transmitted by the WMC device 102, the resource 204b may utilize the standardize language and/or interface to communicate directly, via wireless connection, with the WMC device 102, and/or to perform tasks requested by the WMC device 102.

Figure 3:
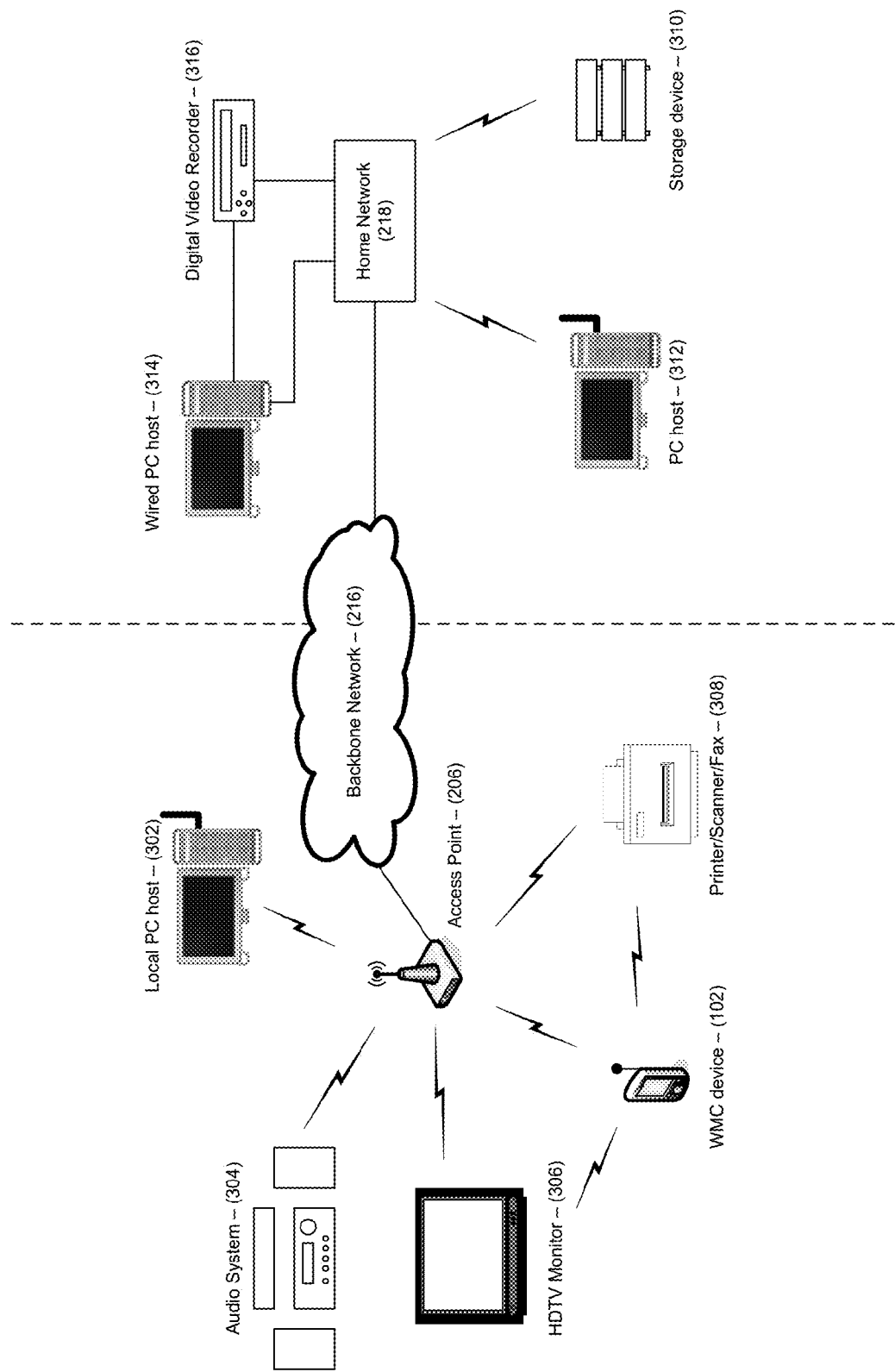
FIG. 3 is a block diagram illustrating a wireless mobile communication (WMC) device configuring and using local and remote resources utilizing standardized language and/or protocol, in accordance with an embodiment of the invention.

FIG. 3 is a block diagram illustrating a wireless mobile communication (WMC) device configuring and using local and remote resources utilizing standardized language and/or protocol, in accordance with an embodiment of the invention. Referring to FIG. 3, there is shown the WMC device 102, the access point 206, the backbone network 216, the home network 218, a local PC host 302, an audio system 304, an HDTV monitor 306, a printer/scanner/fax 308, a storage device 310, a PC host 312, a wired host PC 314, and a digital video recorder (DVR) 316.

The PC host 302, the PC host 312, and the PC host 314 may comprise suitable logic, circuitry and/or code that may be enabled of performing computing, processing and storage management operations. Additionally, the PC host 302 and the PC host 302 may also comprise suitable logic, circuitry and/or code that may enable wireless connectivity based on a wireless protocol that may comprise WiFi (IEEE 802.11). The storage device 310 may comprise suitable logic, circuitry and/or code that may be enabled of performing dedicated memory storage operations. For example, the storage device 310 may comprise an external storage device such as a zip drive.

The audio system 304 may comprise suitable logic, circuitry and/or code that may be enabled to perform audio play operations. For example, the audio system 304 may comprise an A/V (audio/video) receiver and a set of speakers for surround system. The HDTV monitor 306 may comprise suitable logic, circuitry and/or code that may be enabled of performing High Definition (HD) television display operations. The printer/scanner/fax 308 may comprise suitable logic, circuitry and/or code that may be enabled of performing of document printing operations, digital scanning, and/or faxing operations. The DVR 316 may comprise suitable logic, circuitry and/or code that may be enabled of performing digital video recording operation wherein multimedia data files may be generated and/or stored. For example, the DVR 316 may comprise a TiVo® receiver unit.

The PC host 302, the audio system 304, the HDTV monitor 306, and the printer/scanner/fax 308 are coupled to the wireless network 210 via the access point 206, which is also communicatively couple with the WMC device 102. Alternatively, these resources may be communicatively coupled, via wired and/or wireless connections, to other local networks, such as the cellular network 314 for example. Also, any number of networked multimedia input/output devices may be utilized.

The storage device 310, the PC host 312, the wired host PC 314, and DVR 316 are coupled to the home network 218 via wired and/or wireless connections that may utilizing any of a plurality of protocols that may comprise Bluetooth©, WiFi, and/or WiMAX. The number of devices coupled to the home network 218 need not be limited to the number shown in FIG. 2. Accordingly, any number of networked multimedia input/output devices may be utilized.

In operation, some of the local devices to the WMC device 102 may announce their capabilities and availability in instances when the WMC device 102 comes in range of them and discovers the wired or wireless network that links them. For example, the HDTV 306 and/or the printer/scanner/fax 308 may communicate to the WMC device 102 their capabilities and/or availability when WMC device 102 may be sufficiently within communicative operational proximity with these devices. Other local devices that may not be sufficiently within communicative operational proximity with the WMC device 102 may announce their capabilities and availability via available local networks. For example, the PC host 302 and/or the audio system 304 may utilize the access point 206 to announce their capabilities and/or availability to the WMC device 102.

Remote resource may also be enabled to announce their capabilities and/or availability to the WMC device 102. For example, the PC hosts 312 and 314, the DVR 316, and/or storage device 310 may be enabled to announce their capabilities and/or availability to the WMC device 102 via the home network 218, the backbone network 216, and the access point 206.

A standardized language and/or protocol may be utilized to enable the WMC device 102, the local resources, and the remote resources to perform the announcing operations. The standardized language and/or protocol may be utilized in creating announcement messages that detail resources and their capabilities, which the WMC device 102 may utilize to perform discovery of local resources by listening and logging to these announcement messages. For example, the standardized language and/or protocol may specify formats that resources may use to communicate any such capabilities and/or availability to the WMC device 102. An Exemplary format for a resource announcement message may comprise information pertaining to type of resource, type of services and/or capabilities available in the resource, load and/or availability of the resource, and/or any other relevant information the WMC device 102 may utilize. Utilizing standardized format may enable to the WMC device 102 to parse through messaging received from all the local and remote resources more effectively and/or efficiently.

In another embodiment of the invention, the WMC device 102 may poll for available networks and resources. In this manner, the WMC device 102 may maintain a list of local resources that it may communicate with along with their capabilities. The WMC device 102 may also keep a list of remote resources available on its home network and may update that list and the bandwidth capabilities of its connection to the home network 218 via locally available networks at all times. In instances when the user of the WMC device 102 may wish to accomplish a certain multimedia or communications task, the WMC device 102 may configure the local and remote resources in order to accomplish the multimedia or communications task. The standardized language and/or protocol may be utilized to improve the efficiency of performing necessary operations by enabling the resources and the WMC device 102 to communicate via common language that may enable each part of the overall setup to "understand" remaining components.

In an exemplary embodiment of the invention, the home network 218 resources may comprise powerful processing and/or computing capabilities that may be provided by the PC host 314 and/or PC host 312, large storage capabilities that may be further improved with the use of the storage device 310, and transcoding capabilities and local digital video storage that may be provided by the DVR 316. In addition, the WMC device 102 may be connected to a wireless network that includes the HDTV monitor 306 that may be available for use and have high bandwidth connectivity via the access point 206 and the backbone network 216 to the home network 218. The WMC device 102 may create an ad hoc virtual network of devices from the home network 218 to the local resources. This may provide a route for data to be communicated between remote and local resources. For example, multimedia data files may be streamed from the DVR 316, through the PC host 314 for transcoding to a display format that may be suitable for the HDTV monitor 306. The transcoded data may then be communicated through formed routes to the HDTV monitor 306 for display. The WMC device 102 may also configure the ad hoc virtual network and the audio system 304 to play audio that corresponds to the video playing on the HDTV monitor 306.

The standardized language and/or protocol may be utilized in configuring the ad hoc network and linking of resources described above. The WMC device 102 may utilize the standardized language and/or protocol in creating and updating its list of local and remote resources whenever network locality changes. The standardized language and/or protocol may be utilized in creating configuration and/or control messages that may communicated to resources that may need to participate in the ad hock network. For example, the standardized language and/or protocol may specify formats that WMC device 102 and/or resources may utilizing in communicating required settings, routing information, and/or occurrences of expected events and/or conditions. Format may target/source resource, type of services and/or tasks to be performed, and/or any other relevant information necessary to the performances of the requested operations. Utilizing the standardized format may improve efficiency of performing requested tasks within any such ad hoc network because the commonality in communicating control and/or configuration messages enable the resources and/or the WMC device 102 to interact directly.

Because data may be communicated through plurality of nodes, where other users may have access, security may be a concern. Therefore, data that may be communicated between the WMC device 102 and the resources may be encrypted or otherwise coded for improved security. The standardized language and/or protocol may comprise encryption to facilitate such security services. For example, messages composed based on the standardized language and/or protocol may be encoded and decoded based on proprietary and/or standard-based algorithms.

The WMC device 102 may build the ad hoc network based on the user's request for a particular function and the availability of resources. For example, there may be multiple display devices available in a local network, such as the small screen on the WMC device 102 and a larger networked display, such as the HDTV monitor 306. The WMC device 102 may pick the best means of displaying the content based on the bandwidth of the various heterogeneous networks that may be traversed, the requirement and availability of transcoding resources, and the battery power available on the WMC device 102. In instances where there may be sufficient battery and CPU resources available in the WMC device 102, the WMC device 102 may choose to perform the transcoding functions locally. In instances where transcoding may not be available, the WMC device 102 could display the content on a display appropriate for that content. Alternatively, the WMC device 102 may manage local and/or remote resources based on user preference information that may specify such data as when/how/if to use a resource. For example, the user preference information may specify that the WMC device 102 may utilize the closest PC host available. Accordingly, where the WMC device 102 may determine the availability of both PC hosts 302 and 312, the WMC device 102 may choose, based on the user preference information, to utilize the PC host 302 to delegate any computing operations rather than the PC host 312.

In an embodiment of the invention, the standardized language and/or protocol may be modified to support previously unknown resources. For example, where the WMC device 102 may have not previously interacted with printer/scanner/fax 308, the WMC device 102 may update the standardized language and/or protocol to enable discovery of the printer/scanner/fax 308 in the future. Announcement messages may be updated and/or created to enable inclusion of information that may be utilized to identify the printer/scanner/fax 308, and to enable the printer/scanner/fax 308 to report its capabilities and/or availability to the WMC device 102. Alternatively, the standardized language and/or protocol may be updated based on interactions between the WMC device 102 and a known resource, wherein the resource may provide information that enable updating the standardized language and/or protocol. For example, the host PC 312 may make and/or keep a look-up table of resources that the host PC 312 may interact with and/or utilize. The PC host 312 may forward such look-up table to the WMC device 102, wherein the WMC device 102 may update the standardized language and/or protocol based on the look-up tables received from the PC host 312, wherein resources not previously supported may be incorporated into announcement, configuration, and/or control messages based on the standardized language and/or protocol.

Figure 4:
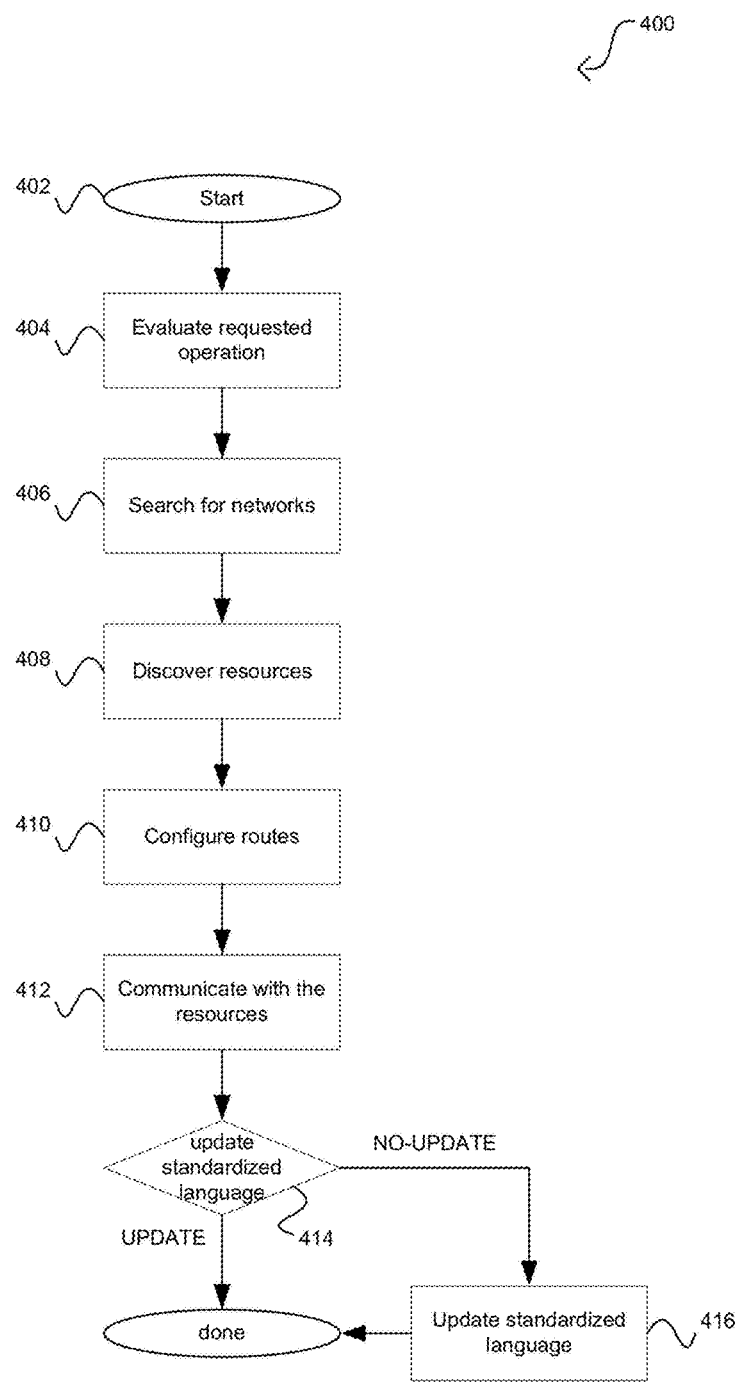
FIG. 4 is a flow chart illustrating a wireless mobile communication (WMC) device configuring and using networks and resources utilizing standardized language and/or protocol, in accordance with an embodiment of the invention.

FIG. 4 is a flow chart illustrating a wireless mobile communication (WMC) device configuring and using networks and resources utilizing standardized language and/or protocol, in accordance with an embodiment of the invention. Referring to FIG. 4, there is shown flow 400. In step 402, the process may commence. The commencement of the process may occur when communicative and/or non-communicative operation may be requested via the WMC device 102. In step 404, an evaluation of the requested operation may be performed. The evaluation of the requested operation may determine the need to utilize networks and/or resources for performing the requested operations. For example, where the requested operation is playing a multimedia file that may be stored within the home network 218 of the WMC device 102, the WMC device 102 may need to utilize networks and/or resource to gain access to the home network 218. In step 406, the WMC device 102 may determine available networks necessary to complete the requested operation. For example, wherein the WMC device 102 may be requested to play a multimedia file stored within the home network 218, the WMC device 102 may determine that the access point 206 and the backbone 216 may be used to communicate with the home network 218.

In step 408, the WMC device 102 may discover available resources. The WMC device 102 may perform tasks necessary for discovery of the resources locally and/or through available networks. The discovery of resources may be based on announcement messages sent out by the resources and/or based on the WMC device 102 polling on the capabilities and/or availability of detected resources either directly, or through available networks, substantially as described in FIG. 3. For example, the WMC device 102 may determine that local resources HDTM monitor 306 and/or audio system 304, and remote resources DVR 316, storage device 310, and/or PC host 312 may be utilized in retrieving and playing a multimedia file available in the home network 218.

A standardized language and/or protocol may be utilized to enable the WMC device 102, the local resources, and the remote resources to perform the announcing operations. The standardized language and/or protocol may be utilized for performing the announcement and/or polling operations. For example, the standardized language and/or protocol may specify formats that resources may use in communicating any such capabilities and/or availability to the WMC device 102 to view announcement messages. The format may comprise type of resource, type of services and/or capabilities available in said resource, load and/or availability of said resources, and/or any other relevant information the WMC device 102 may utilize. Utilizing standardized format may enable to the WMC device 102 to parse through messaging received from all the local and remote resources more effectively and/or efficiently.

In step 410, the WMC device 102 may configure routes necessary to perform the requested operation. For example, where the WMC device 102 may be requested to play a multimedia file that may be stored within the home network 218, the WMC device 102 may create an ad hoc virtual network of devices from the home network 218 to the local resources. This may provide a route for data to be communicated between remote and local resources. For example, multimedia data files may be streamed from the DVR 316, through the PC host 314 for transcoding or re-encoding to a display format that may be suitable for the HDTV monitor 306. The transcoded or re-encoded data may then be communicated through formed routs to the HDTV monitor 306 for display. The WMC device 102 may also configure the ad hoc virtual network and the audio system 304 to play audio that corresponds to the video playing on the HDTV monitor 306.

In step 412, the WMC device 102 may communicate with discovered resources to facilitate performing requested operation. For example, where the WMC device 102 may be requested to play a multimedia file that may be stored within the home network 218, the WMC device 102 may configure the HDTV monitor 306 and/or the audio system 304 to ensure that the multimedia file routed from the home network 218 may be played successfully. Additionally, the WMC device 102 may communicate control message, where necessary, to facilitate performing the requested operation. For example, the WMC device 102 may communicate with the PC host 314 to facilitate performing any necessary transcoding tasks that may enable performing necessary conversion tasks that ensure the format of the routed data may be comparable with the HDTV monitor 306 and/or audio system 304. In communicating with discovered resources and/or network, the WMC device 102 may utilize the standardized language and/or protocol. The standardized language and/or protocol may be utilized in creating configuration and/or control messages that may be communicated to resources that may need to participate in the ad hock network. For example, the standardized language and/or protocol may specify formats that WMC device 102 and/or resources may utilizing in communicating required settings, routing information, and/or occurrences of expected events and/or conditions. Format may include target/source resource, type of services and/or tasks to be performed, and/or any other relevant information necessary to the performances of the requested operations.

In step 414, a determination whether the standardized language and/or protocol may need to be updated is performed. In the instance that the outcome of the determination in step 414 indicate that no update is necessary, the process may terminate. Returning to step 414, in instances where the outcome of the determination in step 414 indicate that updating the standardized language and/or protocol may be necessary, the process may proceed to step 416. In step 416, the standardized language and/or protocol may be updated. The standardized language and/or protocol may be modified to support previously unknown resources. For example, in instances where the WMC device 102 may have not previously interacted with printer/scanner/fax 308, the WMC device 102 may update the standardized language and/or protocol to enable discovery of the printer/scanner/fax 308 in the future.

Consequently, announcement, configuration, and/or control messages may be updated to enable inclusion of information that may be utilized to identify the printer/scanner/fax 308, to enable the printer/scanner/fax 308 to report its capabilities and/or availability, and to receive configuration and/or control information form the WMC device 102. Alternatively, the standardized language and/or protocol may be updated based on interactions between the WMC device 102 and a known resource, wherein the resource may provide information that enable updating the standardized language and/or protocol. For example, the host PC 312 may make and/or keep a look-up table of resources that the host PC 312 may interact with and/or utilize. The PC host 312 may forward such look-up to the WMC device 102, wherein the WMC device 102 may update the standardized language and/or protocol based on the look-up tables received from the PC host 312, wherein resources not previously supported may be incorporated into announcement, configuration, and/or control messages based on the standardized language and/or protocol.

Various embodiments of the invention may comprise a method and system for utilizing standardized interface in a wireless device to discover and use local and remote resources. The WMC device 102 may discover available networks, and available resources. The discovered resource may be local resources located within communicative operational proximity to the WMC device and/or through discovered networks; for example, HDTV monitor 306 and/or audio system 304. Additionally, the discovered resources may comprise remote resources access through one of more of available networks; for example the DVR 316 and/or PC host 314. The WMC device 102 may configure routes utilizing one or more of discovered resources and one or more available networks. The routes may be utilized to perform operations requested via the WMC device 102. A standardized language and/or protocol may be utilized in discovering and/or communicating with available resources and/or networks. The standardized language and/or protocol may enable commonality among elements of established routes. The standardized language and/or protocol may enable encryption of data communicate through the established routes. The standardized language and/or protocol may be updated and/or modified to incorporate new resources either by direct interactions between said new resources and the WMC device 102; or via existing available resources and/or networks. The discovery of resources and/or establishment of routes may be user-trigger, or it may be based on existing user preference information.

Another embodiment of the invention may provide a machine-readable storage, having stored thereon, a computer program having at least one code section executable by a machine, thereby causing the machine to perform the steps as described herein for utilizing standardized interface in a wireless device to discover and use local and remote resources.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, implemented by a wireless communication device, comprising:
   communicating with a first device by using a standardized language or protocol, said standardized language or protocol specifying a resource format;
   communicating with a second device by using the standardized language or protocol;
   configuring an ad hoc network to establish a communication route between the first device and the second device; and
   facilitating a performance of an operation using the first device and the second device by sending a control message to the first device.

2. The method of claim 1, further comprising modifying said standardized language or protocol to enable communication with a third device, wherein the third device is not supported in said standardized language or protocol prior to modifying said standardized language or protocol.

3. The method of claim 2, wherein modifying said standardized language or protocol comprises updating said standardized language or protocol in response to receiving a look-up table from the device, the look-up table identifying the third device.

4. The method of claim 1, further comprising discovering the first device in response to receiving an announcement message from the first device, the announcement message specifying an availability of the first device.

5. The method of claim 1, further comprising discovering the second device in response to receiving an announcement message, the announcement message specifying an availability of the second device.

6. The method of claim 1, wherein discovering the first device comprises polling the first device to determine whether the first device is available to perform the operation.

7. The method of claim 1, further comprising configuring the ad hoc network in response to receiving a request to perform the operation.

8. A system, comprising:
a wireless communication device comprising circuitry that is operable to:
communicate with a first device by using a standardized language or protocol, said standardized language or protocol specifying a resource format;
communicate with a second device by using the standardized language or protocol;
configure an ad hoc network to establish a communication route between the first device and the second device; and
facilitate a performance of an operation using the first device and the second device by sending a control message to the first device.

9. The system of claim 8, wherein the operation is performed in response to sending a control message from the wireless communication device to the first device, the control message being based on said standardized language or protocol.

10. The system of claim 8, wherein said standardized language or protocol comprises a look-up table that enables determining whether the first device is available.

11. The system of claim 8, wherein the circuitry is further operable to modify said standardized language or protocol to enable communication with a third device, wherein the third device not supported in said standardized language or protocol prior to modifying said standardized language or protocol.

12. The system of claim 8, wherein the operation comprises a play operation to play media content, the media content being streamed via the route.

13. The system of claim 8, wherein the circuitry that is operable to determine whether the first device is available is further operable to determine whether the first device is available in response to receiving an announcement message from the first device, the announcement message specifying an availability of the resource.

14. The system of claim 8, wherein the circuitry is further operable to poll the first device to determine whether the first device is available to perform the operation.

15. A method, comprising:
determining, by a wireless communication device, whether a first device is available in response to receiving a request to perform an operation;
discovering a wireless network including at least one second device to perform the operation;
establishing a route between the first device and the wireless network; and
facilitating a performance of the operation using the first device, wherein the operation is performed according to data that is communicated to the first device by the wireless network via the route.

16. The method of claim 15, further comprising using a standardized language or protocol to determine whether the first device is available and to discover the wireless network, wherein said standardized language or protocol specifies a resource format.

17. The method of claim 16, further comprising modifying said standardized language or protocol to enable communication with another device, wherein the other device is not supported in said standardized language or protocol prior to modifying said standardized language or protocol.

18. The method of claim 16, wherein the operation is performed in response to sending a control message from the wireless communication device to the first device, the control message being based on said standardized language or protocol.

19. The method of claim 16, wherein the determining whether the first device is available comprises determining whether the first device is available by receiving an announcement message from the first device, the announcement message specifying an availability of the first device, the announcement message being based on said standardized language or protocol.

20. The method of claim 15, wherein determining whether the first device is available comprises polling the device to determine whether the resource is available to perform the operation.

* * * * *